(12) United States Patent
Dewan et al.

(10) Patent No.: US 11,520,859 B2
(45) Date of Patent: Dec. 6, 2022

(54) DISPLAY OF PROTECTED CONTENT USING TRUSTED EXECUTION ENVIRONMENT

(71) Applicant: Intel Corporation, Santa Clara, CA (US)

(72) Inventors: Prashant Dewan, Portland, OR (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1165 days.

(21) Appl. No.: 15/942,096

(22) Filed: Mar. 30, 2018

(65) Prior Publication Data

US 2019/0042706 A1 Feb. 7, 2019

(51) Int. Cl.
*G06F 21/10* (2013.01)
*G06F 21/44* (2013.01)
*H04L 9/40* (2022.01)

(52) U.S. Cl.
CPC .............. *G06F 21/10* (2013.01); *G06F 21/44* (2013.01); *H04L 63/0428* (2013.01); *H04L 63/061* (2013.01); *H04L 63/0823* (2013.01)

(58) Field of Classification Search
CPC ..... G06F 21/10; G06F 21/44; H04L 63/0428; H04L 63/061; H04L 63/0823
See application file for complete search history.

(56) References Cited

U.S. PATENT DOCUMENTS

| | | | |
|---|---|---|---|
| 2016/0119302 A1* | 4/2016 | Yi | H04L 63/126 713/171 |
| 2016/0188889 A1* | 6/2016 | Narendra Trivedi | G06F 21/6218 713/189 |
| 2016/0254907 A1* | 9/2016 | Messerman | H04N 21/2347 380/279 |
| 2019/0089529 A1* | 3/2019 | Conway | H04L 9/3247 |
| 2020/0028698 A1* | 1/2020 | Hunacek | H04N 21/4302 |

* cited by examiner

*Primary Examiner* — Ashokkumar B Patel
*Assistant Examiner* — Forrest L Carey
(74) *Attorney, Agent, or Firm* — Alliance IP, LLC

(57) ABSTRACT

The present disclosure is directed to secure processing and display of protected content. The use of a trusted execution environment (TEE) to handle authentication and session key negotiation in accordance with a selected content protection protocol may reduce any trusted computing base (TCB) needed for such operations, and thereby present a smaller target for potential attackers. Techniques are presented in which a session key negotiated via such a TEE is securely provided to output circuitry such as a display controller, which may encrypt protected content that has been requested for viewing on a protocol-compliant display device communicatively coupled to a device comprising the TEE and/or the output circuitry. The output circuitry may then provide the encrypted protected content to the protocol-compliant display device, such as for compliant display of the protected content.

17 Claims, 6 Drawing Sheets

DISPLAY OF PROTECTED CONTENT USING TRUSTED EXECUTION ENVIRONMENT

TECHNICAL FIELD

The present disclosure relates to the display of security-critical or other protected content, and more particularly, to a system that may enable the display of such protected content via one or more trusted execution environments.

BACKGROUND

The protection of device and data integrity has become essential as common interactions are increasingly performed via electronic communication. For example, users may execute data and financial transactions, business-related transactions, etc. utilizing electronic communication. The display of information related to such transactions, as well as the display of other protected content (such as content protected via digital rights management or other copyright enforcement schema), requires computing systems hosting such protected content to enable secure provision of the protected content to a compliant display device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
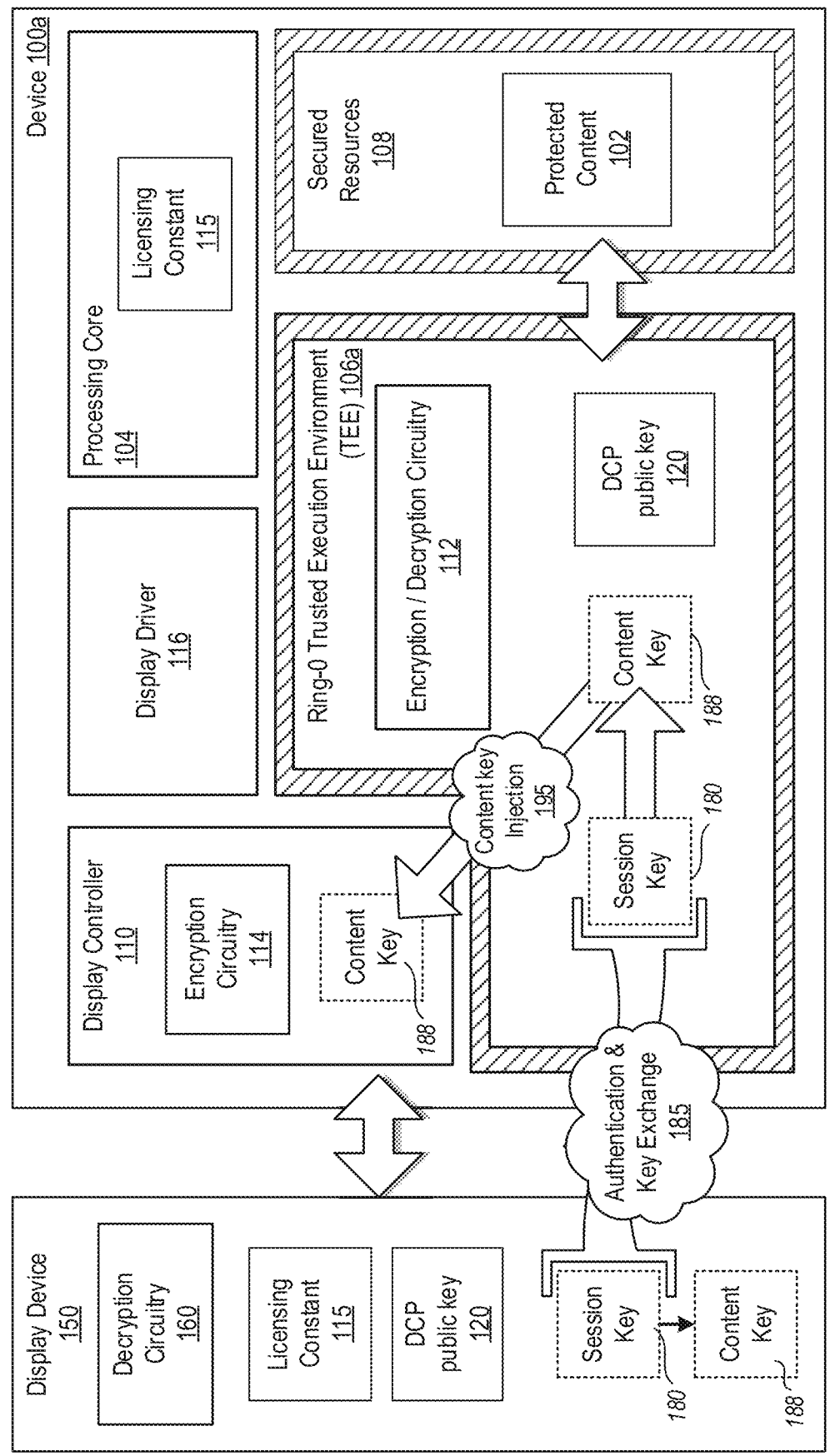
FIG. 1A illustrates an example of a device able to perform secure processing and display of protected content in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to secure processing and display of protected content. The display of protected content (such as security-critical or other confidential information, or content subject to digital rights management or other copyright enforcement schema) may be subject to a variety of vulnerabilities occurring between the computing system(s) hosting such content and a display device needed to render the protected content for display to authorized individuals. To counter or protect from such vulnerabilities, content protection protocols have been created, such as high bandwidth digital content protection protocol (HDCP). Consistent with the present disclosure, a trusted execution environment (TEEs) may be provided to handle authentication of a protocol-compliant display device and session key exchange, as well as to generate and provide other cryptographic keys used to encrypt the protected content within a host computing system and to decrypt the protected content after transmission of the encrypted protected content to the display device. The TEE may provide a secure location in which key exchange, key generation, and content encryption may be processed, as well as determining whether to grant access to the protected content. The TEE may comprise, for example, secure encryption and/or decryption circuitry to authenticate a protocol-compliant display device and to generate one or more content protection cryptographic keys; as well as secure storage circuitry to store security-critical cryptographic keys, the protected content, and other sensitive information. By utilizing manufacturer-agnostic TEEs rather than proprietary management engines to handle such operations, the techniques presented herein may reduce any trusted computing base (TCB) needed for such operations, and thereby present a smaller target for potential attackers (e.g., hackers, pirates, etc.).

In at least one embodiment, a device suitable for performing some or all of the techniques described herein may comprise, for example, secured resources, memory circuitry and processing circuitry (including one or more central-processing cores), and output circuitry (e.g., display controller circuitry). The output circuitry may be to encrypt and provide protected content to an external display device, such as by using one or more cryptographic keys provided from the memory circuitry and/or processing circuitry. The memory circuitry and processing circuitry may comprise at least a TEE having encryption and/or decryption circuitry therein to control access to the protected content based on at least one content protection protocol and one or more authentication protocols.

In at least one embodiment, the processing circuitry may be to initiate authentication and key exchange with a protocol-compliant display device, as well as to generate one or more cryptographic keys and to provide such generated keys to the output circuitry. The memory circuitry may securely store one or more portions of protected content for provision to a protocol-compliant display device, as well as one or more of a licensing constant associated with a content protection protocol (such as HDCP) and a public key associated with a trusted third-party certificate issuer related to that content protection protocol. The output circuitry (e.g., display controller circuitry) may be to encrypt protected content with a generated cryptographic key prior to providing the encrypted protected content to the protocol-compliant display device. In certain embodiments, and as discussed in greater detail elsewhere herein, the processing circuitry may further be to retrieve and utilize a device-specific key in order to send a negotiated session key from a TEE of the device to a device driver within the device, such as if the TEE is unauthorized to communicate with or otherwise access the output circuitry. The device may further comprise at least secure interface circuitry to access one or more memory locations associated with the device-specific key and transfer the negotiated session key. The memory location associated with the device-specific key may be fixed in the memory circuitry, and the processing circuitry may further be to provide the one or more memory locations of the device-specific key to the secure interface circuitry.

FIG. 1A illustrates an example of a device 100a able to perform secure processing and display of protected content in accordance with at least one embodiment of the present disclosure, shown in conjunction with a display device 150 that is separate from but communicatively coupled to the device 100a. While various implementations are discussed herein employing technologies such as, but not limited to, Software Guard Extensions (SGX) technology, Virtual Machine Management (VMM) or other Hypervisor technology, and Management Engine (ME) technology, these particular technologies (e.g., technologies developed by the Intel Corporation) are offered merely as readily comprehensible examples from which the various apparatuses, systems, methodologies, etc. discussed herein may be understood.

Device 100a may be an apparatus able to at least securely store data and securely process data. Examples of device 100a may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer (e.g., an iPad® from the Apple Corporation, Surface® from the Microsoft Corporation, Galaxy Tab® from the Samsung Corporation, Kindle® from the Amazon Corporation, etc.), an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

As shown in FIG. 1A, device 100a may comprise, for example, at least a processing core 104, a TEE 106a, secured resources 108, display controller 110 and display driver 116, and is communicatively coupled to display device 150. While device 100a is pictured as a single apparatus, device 100a may actually be constructed from a combination of similarly-configured devices (e.g., a group of rack or edge servers) or differently-configured devices. For example, one or more of the processing core 104, TEE 106a, secured resources 108 and display controller 110 may reside in a separate device.

In general, TEE 106a may comprise a set of computing resources that are secure such that programs executing within TEE 106a, and any data associated with these executing programs, are isolated from other resources in device 100a. Outside actors cannot interfere with or observe the programs/data within TEE 106a during program execution with the exception that the program may be started or stopped and the associated data may be inserted or deleted. Any data leaving TEE 106a may be released in a controlled manner. In at least one embodiment, the TEE 106a may be based on, as non-limiting examples, one or more of Virtual Machine Management (VMM) technology and Management Engine (ME) technology. In at least one exemplary implementation, TEE 106a may utilize such technology to protect the integrity of device 100a and data stored within device 100a. Thus, TEE 106a may provide a secure, hardware-encrypted computation and information storage location within device 100a, the contents of which cannot be deciphered by privileged code or even through the application of hardware probes to memory bus in device 100a. Embodiments consistent with the present disclosure make it impossible for intruders to decipher the contents of TEE 106a.

In an example implementation, the identity of programs (e.g., based on a cryptographic hash measurement of each program's contents) may be signed and stored inside each program. When the programs are then loaded into TEE 106a, the processor may verify that the measurement of the program is identical to the prior measurement embedded inside the program. The signature employed to sign the embedded measurement may also be verifiable because a public key may be available to verify the signature at program load time. Malware cannot tamper with the program because its verifiable measurement would also be altered. Malware also cannot spoof the signature because the signing key is secure with the program's author. Thus, the software may not be read, written to or altered by any malware. Data may also be protected in TEE 106a. For example, known-good programs executing in TEE 106a may encrypt a variety of data such as keys, passwords, licenses, etc. so that only verified good programs may decrypt this data. Data protected within TEE 106a cannot be observed or accessed by components or actions external to the TEE 106a.

It will be appreciated that TEE 106a may be unified or may be broken into separate occurrences of TEE 106a in device 100a. Utilizing multiple separate instances of TEE 106a may require more resources in device 100a, but may also provide better security because one instance of TEE 106a becoming compromised (e.g., corrupted) may not affect the integrity of the other instances of TEE 106a, allowing unaffected instances to remain intact, functional, secure, etc.

In the depicted embodiment of FIG. 1A, processing core 104 is provisioned with licensing constant 115, such as via the licensing constant being embedded within the processing core in a manner such that the licensing constant is available via one or more microcode instructions enabled by and compatible with the processing core. The licensing constant 115 may be associated with one or more content protection protocols. For purposes of example, the techniques described herein will be described with particular reference to the content protection protocol HDCP; it will be appreciated that other or additional content protection protocols may be employed without deviating from the intention or scope of the described techniques. In the depicted embodiment, licensing constant 115 is a 128-bit constant ("LC128") that is associated with HDCP and provided to all HDCP adopters.

In at least the depicted embodiment, TEE 106a may comprise at least encryption/decryption circuitry 112, and may be provisioned with DCP public key 120. The DCP public key 120 is associated with the public certificate-issuing entity Digital Content Protection (DCP) LLC, and is used to authenticate certificates issued to manufacturers of HDCP-compliant devices; it will be appreciated that other information associated with other certificate authentication systems and methods may be utilized in additional scenarios and embodiments without deviating from the intention or scope of the described techniques. Encryption/decryption circuitry 112 may be to encrypt and/or decrypt information by utilizing one or both of licensing constant 115 and DCP public key 120. As one example, encryption/decryption circuitry 112 may be to generate a cryptographic encryption key (i.e., content encryption key 188) for encrypting protected content, such as by modifying a session key negotiated with display device 150 in a manner based on the licensing constant 115. Display controller circuitry 110 may be to receive the generated content encryption key from TEE 106a and to encrypt protected content 102 using the content encryption key via encryption circuitry 114.

Secured resources 108 may comprise, for example, equipment, applications, protected content and/or other data, etc. that is protected by security measures in device 100a. In general, secured resources 108 may not be accessed without being allowed permission by these security measures. For example, an attempt to access secured resources 108 may trigger a security protocol in device 100a.

The decryption circuitry 160 of the communicatively coupled display device 150 may be, as will be described in greater detail below, to decrypt protected content encrypted by the display controller circuitry 110 via the encryption circuitry 114. In certain embodiments, decryption circuitry 160 may further include additional circuitry to modify a session key negotiated with TEE 106a in a manner based on the licensing constant 115.

In an example of operation, TEE 106a may initiate authentication of and key exchange with display device 150, such as in response to receiving a request to display one or more portions of protected content 102. Additional details regarding the authentication and key exchange are provided below with respect to FIG. 3. The result of authentication & key exchange operations 185 is that display device 150 is authenticated by TEE 106a as compliant with the exemplary HDCP protocol, and both the TEE 106a and display device 150 are provisioned with negotiated session key 180. In certain embodiments, the TEE 106a may modify the session key 180 via encryption/decryption circuitry 112 using the licensing constant 115 in order to generate a session-specific content encryption key 188; in other embodiments, the content encryption key 188 may be generated as part of the authentication and key exchange 185. In the particular embodiment of FIG. 1A and in compliance with the HDCP protocol, for example, the encryption/decryption circuitry may generate the session-specific content encryption key 188 by performing an XOR operation on the negotiated session key 180 with licensing constant 115, such that $K_C = K_S \text{ XOR } LC_{128}$ Where $K_S$ is the negotiated session key 180, $LC_{128}$ is the 128-bit licensing constant, and $K_C$ is the resulting session-specific content encryption key.

Continuing the exemplary embodiment of FIG. 1A, it will be appreciated that HDCP robustness requirements require the licensing constant 115 to have hardware-level circuitry-implemented protection. In order to meet such robustness requirements, the provisioning of licensing constant 115 to the processing core 104 may be implemented in a variety of manners in accordance with the techniques described herein. As one example, the licensing constant 115 may be burnt in fuses that are within the processing circuitry of device 100a and accessible via microcode. As another independent example, the licensing constant 115 may be embedded in microcode (such as within firmware of the device 100) and patched if needed (e.g., if an operating entity associated with the HDCP protocol issues a license-wide revocation and/or replacement of $LC_{128}$). It will be appreciated that other hardware-specific circuitry-level implemented protective measures may be used in order to provision device 100a with licensing constant 115.

After the content encryption key 188 ($K_C$) is generated, it may be provided to the display controller 110, such as for use in encrypting protected content 102 before providing such protected content to the communicatively coupled display device 150. For purposes of the exemplary embodiment of FIG. 1A, it will be appreciated that TEE 106a comprises a ring-0 TEE, and that it therefore may communicate via secure channels directly with the display controller 110. Additional details will be provided below with respect to an alternative exemplary embodiment of FIG. 1B, in which the TEE instantiated within a device 100b is a non-ring-0 TEE, and therefore may not communicate directly with the display controller 110. Within the embodiment of FIG. 1A, the ring-0 TEE 106a may utilize microcode that is secure against both software and hardware attacks to communicate with the display controller 110. Such microcode may, in certain embodiments, have access to sideband communications. With respect to display controller 110, it may include a quantity of HDCP-compliant key registers that allow such microcode to have access via sideband communications; in this manner, the content encryption key 188 may be provided directly to the display controller 110.

As an example of microcode instructions to utilize for providing the content encryption key 188 to the display controller 110 (operations depicted in the embodiment of FIG. 1A as content encryption key injection operations 195), assume that negotiated session key 180 comprises 128 bits stored in two 64-bit registers RBX:RCX. A microcode instruction HDCP_INJECT is provided, having first parameters to accept the two registers RBX:RCX. Optionally, a second MODE parameter may be utilized, such as to indicate whether the negotiated session key 180 is encrypted or in plaintext. A MODE value of 0 may indicate a non-ring-0 TEE, whereas a MODE value of 1 may indicate a ring-0 TEE. Thus, the microcode instruction may be summarized as:

```
Parameters:
RAX:              Mode
RBX:RCX:          Session key (encrypted or plaintext)
Operation:
TMP_SESSION_KEY = RBX:RCX;
If (RAX == 0)
{
    TMP_SESSION_KEY = DECRYPT(CPU_key,
    TMP_SESSION_KEY)
}
TMP_CONTENT_KEY = TMP_SESSION_KEY XOR LC128
<<Program TMP_CONTENT_KEY to the display controller 110 using sideband>>
``` where CPU_key is a device-specific cryptographic key, such as may be hardware-embedded in processing circuitry of the device 100 and accessible via microcode, and where LC128 is licensing constant 115.

In the depicted embodiment of FIG. 1A, the content encryption key may be provided to the display controller 110 as plaintext (i.e., without being further encrypted or modified, other than via any appropriate encoding) by the TEE 106a. Thus, for the depicted embodiment the mode RAX in the example above would indicate that the session key is plaintext, and no retrieval or use of the device-specific cryptographic key may be warranted. Additional details are presented elsewhere herein (such as with respect to FIG. 1B) regarding scenarios in which the device-specific cryptographic key may be utilized to encrypt the negotiated session key 180 as part of passing the session key to ring-0 software (e.g., a software-based display driver) or other ring-0 components in accordance with the described techniques.

Once the display controller 110 is provisioned with the content encryption key, it may utilize the content encryption key to encrypt protected content 102 via encryption circuitry 114. It will be appreciated that, because the protected content 102 is encrypted using the content encryption key, such protected content may be handled or otherwise accessed by system software external to the TEE without compromising the protected content. As discussed above, in the current example utilizing the HDCP content protection protocol, the content encryption key is based on the session key negotiated between display device 150 and TEE 106a, and on the licensing constant 115 with which both the display device and processing core 104 have been separately provisioned. Thus, in at least some embodiments, as part of (or at any time after) authentication & key exchange operations 185, the display device 150 may cooperatively or independently generate the content encryption key in the manner described above with respect to the generation of that content encryption key by TEE 106a. After the display controller 110 transmits the encrypted protected content 102 to the display device 150, the display device may decrypt the protected content using the content encryption key 188, and display the requested portions of protected content 102.

Figure 1B:
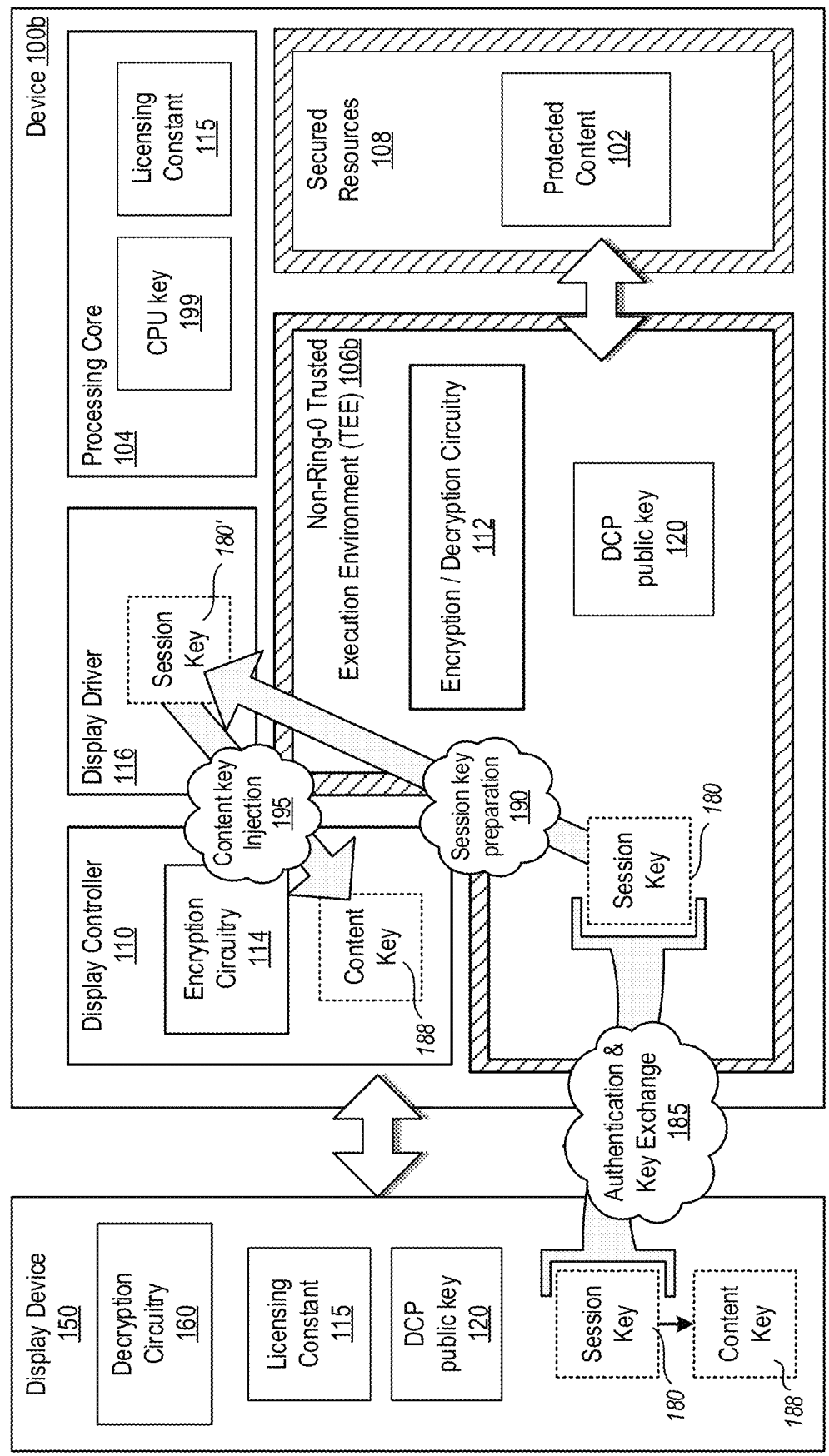
FIG. 1B illustrates another independent example of a device able to perform secure processing and display of protected content in accordance with at least one embodiment of the present disclosure.

FIG. 1B illustrates an exemplary device 100b that is able to perform secure processing and display of protected content in accordance with another embodiment of the present disclosure, shown in conjunction with a display device 150 that is separate from but communicatively coupled to the device 100a. It will be understood that throughout the discussion of FIG. 1B, implicit or explicit reference may be made to circuitry and/or other components additionally referenced within FIG. 1A, and that unless context clearly indicates otherwise, identically or similarly numbered components may represent identical or similar embodiments.

As shown in FIG. 1B, device 100b comprises a processing core 104, a non-ring-0 TEE 106b, secured resources 108, display controller 110, and display driver 116; the device 100b is communicatively coupled to display device 150. Similarly to device 100a of FIG. 1A, although device 100b is pictured as a single apparatus, it may actually be constructed from a combination of similarly-configured devices (e.g., a group of rack or edge servers) or differently-configured devices. For example, one or more of processing core 104, TEE 106b, secured resources 108 and display controller 110 may reside in one or more separate devices.

In at least one embodiment, TEE 106b may be based on, as a non-limiting example, one or more of Software Guard Extensions (SGX) technology and Management Engine (ME) technology. In at least one exemplary implementation, TEE 106b may utilize such technology to protect the integrity of device 100b and data stored within device 100a. For the sake of example, SGX may provide a secure, hardware-encrypted computation and information storage location within device 100b, the contents of which cannot be deciphered by privileged code or even through the application of hardware probes to memory bus in device 100a. When TEE 106b is protected by SGX, embodiments consistent with the present disclosure make it impossible for intruders to decipher the contents of TEE 106b. Protected data cannot be observed outside of SGX, and thus, is inaccessible outside of SGX.

As noted elsewhere herein, for purposes of the described techniques, a distinction between the TEE 106a of FIG. 1A and TEE 106b of FIG. 1B is that while ring-0 TEE 106a is enabled to directly access or control the display controller 110, non-ring-0 TEE 106b is unable to do so. Generally, although particular operations are described elsewhere herein in greater detail, the primary difference between the exemplary embodiment of FIG. 1A and that of FIG. 1B is that in the embodiment of FIG. 1B, although non-ring-0 TEE 106b may initiate authentication of and session key exchange with display device 150, it then securely provides the negotiated session key 180 to one or more ring-0 components (such as display driver 116) in order to provision the display controller 110 with the content encryption key to the display controller 110, with which the non-ring-0 TEE 106b is unable to directly communicate.

Thus, in an additional example of operation and with continuing reference to FIG. 1B, non-ring-0 TEE 106b may initiate authentication of and key exchange with display device 150, such as in response to receiving a request to display one or more portions of protected content 102. As a result of authentication & key exchange operations 185, display device 150 is authenticated by non-ring-0 TEE 106b as compliant with exemplary protocol HDCP, and both the non-ring-0 TEE 106b and display device 150—both of which have been previously provisioned with the DCP public key 120, as described elsewhere herein—are further provisioned with negotiated session key 180.

As noted elsewhere, and in contrast with the TEE 106a of FIG. 1A, the non-ring-0 TEE 106b is unable to directly communicate with display controller 110. Therefore, in order to securely pass the negotiated session key 180 to the display driver 116 via session key preparation operations 190, non-ring-0 TEE 106b utilizes a device-specific cryptographic key (CPU key 199) which may be read from known registers within processing core 104 in order to encrypt the session key 180. As an example of microcode instructions to utilize for providing the encrypted session key, again assume that the negotiated session key 180 comprises 128 bits, and that registers RBX and RCX each comprise 64 bits. A microcode instruction HDCP_PREPARE may be summarized as having a first parameter to provide the addresses of the two registers storing the session key 180:

Parameters:
RBX:RCX: Session Key
Operation:
TMP_SESSION_KEY=RBX:RCX;
TMP_SESSION_KEY=ENCRYPT (CPU_Key, TMP_SESSION_KEY);
RBX:RCX=TMP_SESSION_KEY;

This HDCP_PREPARE instruction reads the key stored in RBX:RCX, encrypts the key using the device-specific cryptographic key (which may be provisioned on each reset and secured in the processing circuitry of device 100b), and stores the encrypted session key 180' in RBX:RCX. The instruction may therefore be used by a non-ring-0 TEE (e.g., non-ring-0 TEE 106b) to pass the negotiated session key 180 to a ring-0 component (e.g., display driver 116) while protecting the session key from untrusted software. It will be appreciated that as described with respect to the previous exemplary embodiment of FIG. 1A, ring-0 TEE operations may disregard the HDCP_PREPARE step, as such operations may be responsible for managing the resources on the platform and can directly communicate with and/or otherwise access the display controller 110 directly.

With continuing reference to the operations of FIG. 1B, the remaining operations may be substantially similar to those described above with respect to FIG. 1A. Notably, however, it is the display driver 116 that may perform content encryption key injection operations 195, such as via use of the HDCP_INJECT microcode instruction previously described. In particular, display driver 116 may utilize HDCP_INJECT (with appropriate MODE and session key parameters) in order to generate the content encryption key 188 and provide the content encryption key to the display controller 110, such as via sideband communications. Once the display controller 110 is provisioned with the content encryption key, it may utilize the content encryption key to encrypt protected content 102 via encryption circuitry 114. As with the exemplary embodiment of FIG. 1A, either as part of authentication and key exchange operations 185 or subsequent to such operations, display device 150 may cooperatively or independently generate the content encryption key; after the display controller 110 transmits the encrypted protected content 102 to the display device 150, the display device may therefore decrypt the protected content using the content encryption key and display the requested portions of protected content 102.

Figure 2:
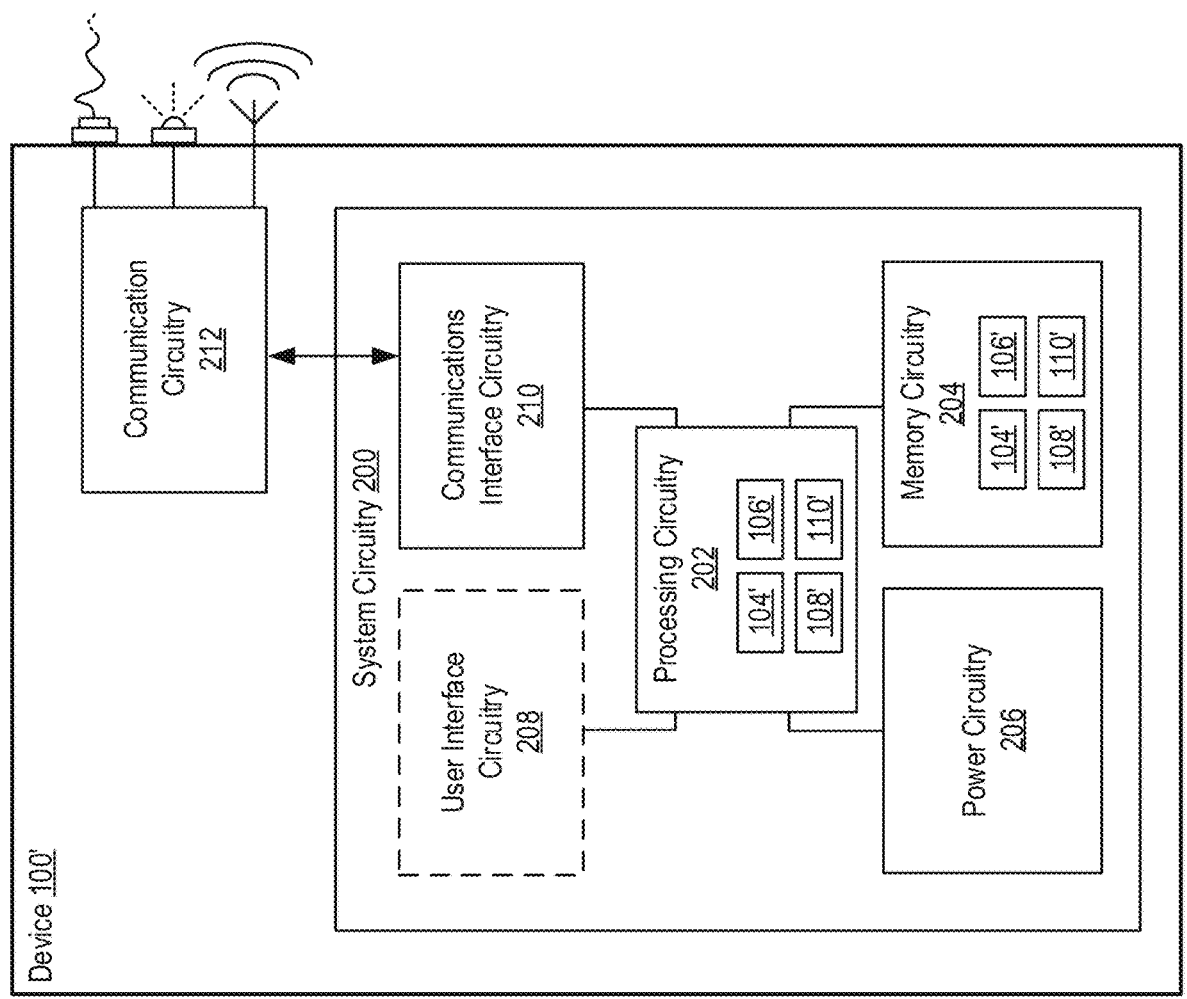
FIG. 2 illustrates an example configuration for a device usable in accordance with at least one embodiment of the present disclosure.

FIG. 2 illustrates an example configuration for a device usable in accordance with at least one embodiment of the present disclosure. Device 100' may be capable of performing any or all of the activities discussed above with respect to FIGS. 1A-1B. However, device 100' is presented only as an example of an apparatus usable in various embodiments consistent with the present disclosure, and is not intended to limit any of the various embodiments to any particular manner of configuration, implementation, etc. As used herein, the inclusion of an apostrophe after an item number in a drawing figure (e.g., 100') may indicate that an exemplary embodiment of the particular item is being shown. These exemplary embodiments are not intended to limit the present disclosure to only what is illustrated, and have been presented herein merely for the sake of convenient explanation.

Device 100' may comprise at least system circuitry 200 to manage device operation. System circuitry 200 may include, for example, processing circuitry 202, memory circuitry 204, power circuitry 206, user interface circuitry 208 and communications interface circuitry 210. Device 100' may further include communication circuitry 212. While communication circuitry 212 is shown as separate from system circuitry 200, the example configuration of device 100' has been provided herein merely for the sake of explanation. Some or all of the functionality associated with communication circuitry 212 may also be incorporated into system circuitry 200.

In device 100', processing circuitry 202 may comprise one or more processors (e.g., one or more host processors) situated in separate components, or alternatively one or more processing cores (e.g., one or more host processing cores) situated in one component (e.g., in an SoC), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors or any other evolution of computing paradigm or physical implementation of such integrated circuits (ICs), etc. Examples of support circuitry may include chipsets (e.g., Northbridge, Southbridge, etc. available from the Intel Corporation) configured to provide an interface via which processing circuitry 202 may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing circuitry 202 may be configured to execute various instructions in device 100'. Instructions may include program code and/or microcode configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include nonvolatile (NV) memory circuitry configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 206 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 208 may be incorporated within device 100' and/or may be coupled to device 100' via a wired or wireless communication medium. In an example implementation wherein device 100' is a multiple device system, user interface circuitry 208 may be optional in devices such as, for example, servers (e.g., rack/blade servers, etc.) that omit user interface circuitry 208 and instead rely on another device (e.g., an operator terminal) for user interface functionality.

Communications interface circuitry 210 may be configured to manage packet routing and other functionality for communication circuitry 212, which may include resources configured to support wired and/or wireless communications. In some instances, device 100' may comprise more than one set of communication circuitry 212 (e.g., including separate physical interface circuitry for wired protocols and/or wireless radios) managed by communications interface circuitry 210. Wired communications may include serial and parallel wired or optical mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound waves, lasers, etc. In one embodiment, communications interface circuitry 210 may be configured to prevent wireless communications that are active in communication circuitry 212 from interfering with each other. In performing this function, communications interface circuitry 210 may schedule activities for communication circuitry 212 based on, for example, the relative priority of messages awaiting transmission. While the embodiment disclosed in FIG. 2 illustrates communications interface circuitry 210 being separate from communication circuitry 212, it may also be possible for the functionality of communications interface circuitry 210 and communication circuitry 212 to be incorporated into the same circuitry.

Consistent with the present disclosure, the circuitry identified as processing core 104', TEE 106', secured resources 108', and display controller 110' may comprise hardware, or combinations of hardware and software, configured to transport and process data, including but not limited to licensing constants, cryptographic keys, protected content, and other data. "Hardware" as referenced herein, may include, for example, discrete analog and/or digital components (e.g., arranged on a printed circuit board (PCB) to form circuitry), at least one integrated circuit (IC), at least one group or set of ICs that may be configured to operate cooperatively (e.g., chipset), a group of IC functionality fabricated on one substrate (SoC), or combinations thereof. Thus, a hardware portion of processing core 104', TEE 106', secured resources 108' and/or display controller 110' may reside in processing circuitry 202. In at least one example embodiment, part of at least the circuitry in TEE 106' and secured resources 108' may be composed of software (e.g., instructions, data, etc.) that, when loaded into RAM in memory circuitry 204, may cause processing circuitry 202 to transform from general purpose processing circuitry into specialized circuitry configured to perform certain functions based on software portions of TEE 106', secured resources 108', and/or display controller 110.

Figure 3:
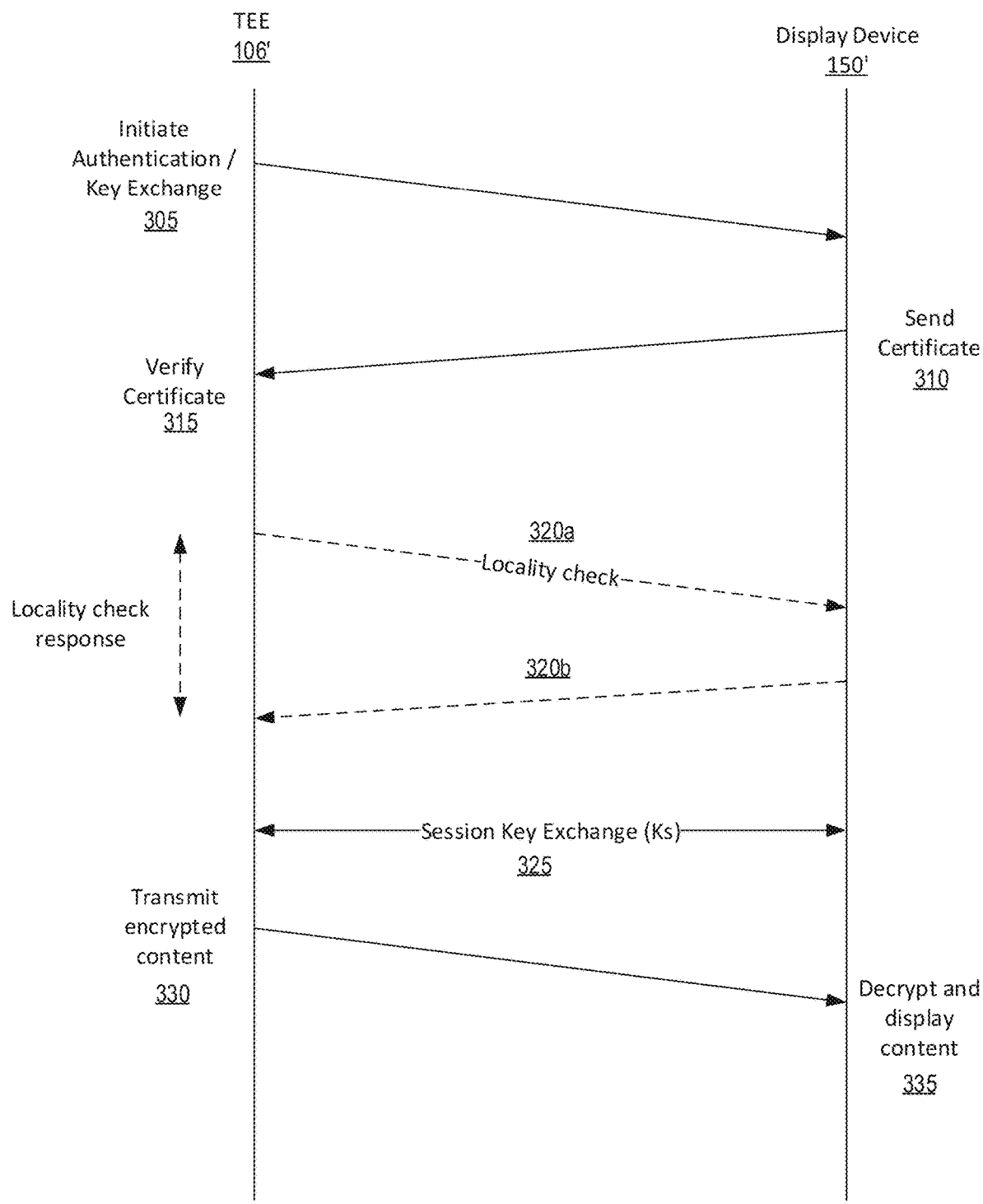
FIG. 3 illustrates exemplary operations for authentication and key exchange with a compliant display device via use of a trusted execution environment in accordance with at least one embodiment of the present disclosure.

FIG. 3 illustrates exemplary operations for authentication and key exchange with a compliant display device via use of a TEE in accordance with at least one embodiment of the present disclosure, and in particular illustrates operations consistent with the exemplary embodiments described above with respect to FIGS. 1A and 1B. The operations begin at 305, in which TEE 106' initiates authentication and key exchange with a display device 150' in order to authenticate the display device as being compliant with a selected content protection protocol—in this example, HDCP. In operations 310, the display device 150' sends a certificate signed with an indication (such as DCP public-key 120) of a trusted third-party. In operations 315, the TEE 106' verifies the certificate using its own provisioned copy of the DCP public key 120; in this manner, the TEE 106' authenticates the display device 150' as being HDCP-compliant. In operation 320a, the TEE 106' initiates a locality check, such as to determine that the receiver is local. In certain embodiments, the response issued by display device 150' via operation 320b must be received by TEE 106' within a defined threshold, such as within 20 milliseconds or other defined threshold. Once the locality check is completed, a session key $K_S$ is determined via session key exchange operations 325; such operations are delineated in various compliance standards associated with the HDCP protocol, and additional detail will not be presented herein. Further operations regarding the preparation and encryption of protected content are detailed elsewhere herein; subsequent to such preparation and encryption of the protected content, it is transmitted via operation 330. In the particular embodiment of FIG. 3, the encrypted protected content is depicted as being transmitted by the TEE 106'; it will be appreciated that in accordance with the descriptions of other embodiments noted herein, such transmission may also be performed via various output circuitry, including via a display controller of device 100a, 100b, and/or 100'. In operation 335, the display device 150' decrypts and displays the protected content.

Figure 4A:
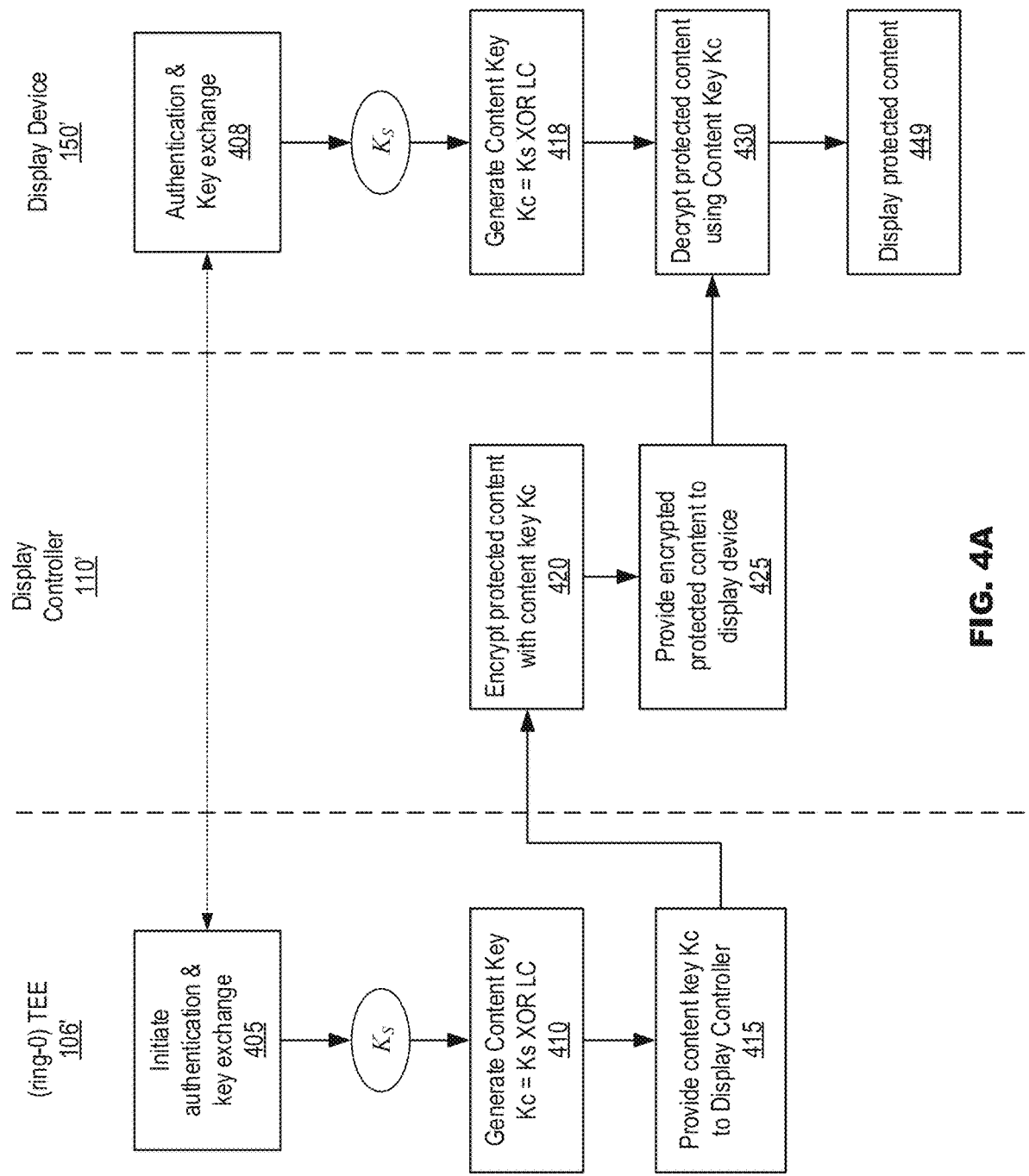
FIG. 4A illustrates exemplary operations for secure processing and display of protected content in accordance with at least one embodiment of the present disclosure.

FIG. 4A illustrates exemplary operations for secure processing and display of protected content in accordance with at least one embodiment of the present disclosure, with various operations being depicted in graphically separated areas according to the particular circuitry and/or components performing such operations.

In operation 405 a TEE 106', assumed for this example to comprise a ring-0 TEE, initiates authentication and key exchange with a display device 150', such as in response to a request to display protected content, and resulting in the provision of negotiated session key $K_S$ to both TEE 106' and display device 150'. In operation 410, a content encryption key $K_C$ is generated by TEE 106' based on the session key and a provisioned licensing constant. In operation 415, the generated content encryption key is provided to a display controller 110'. In at least some embodiments, one or both of operations 410 and 415 may be performed by the TEE 106' via microcode instructions such as the HDCP_INJECT instruction described elsewhere herein. In operation 420, the display controller 110' encrypts the protected content with the generated content encryption key provided by TEE 106'. In operation 425, the display controller 110' provides the encrypted protected content to display device 150'.

In a manner similar to that noted elsewhere with respect to other exemplary embodiments described herein, once negotiated session key $K_S$ was established via operations 405 and 408, in operation 418 the display device 150' may generate its own copy of content encryption key $K_C$. In operation 430, the display device 150' uses the generated content encryption key to decrypt the protected content provided via operation 425 by the display controller 110'. In operation 449, display device 150' displays the protected content in compliance with the selected HDCP protocol.

Figure 4B:
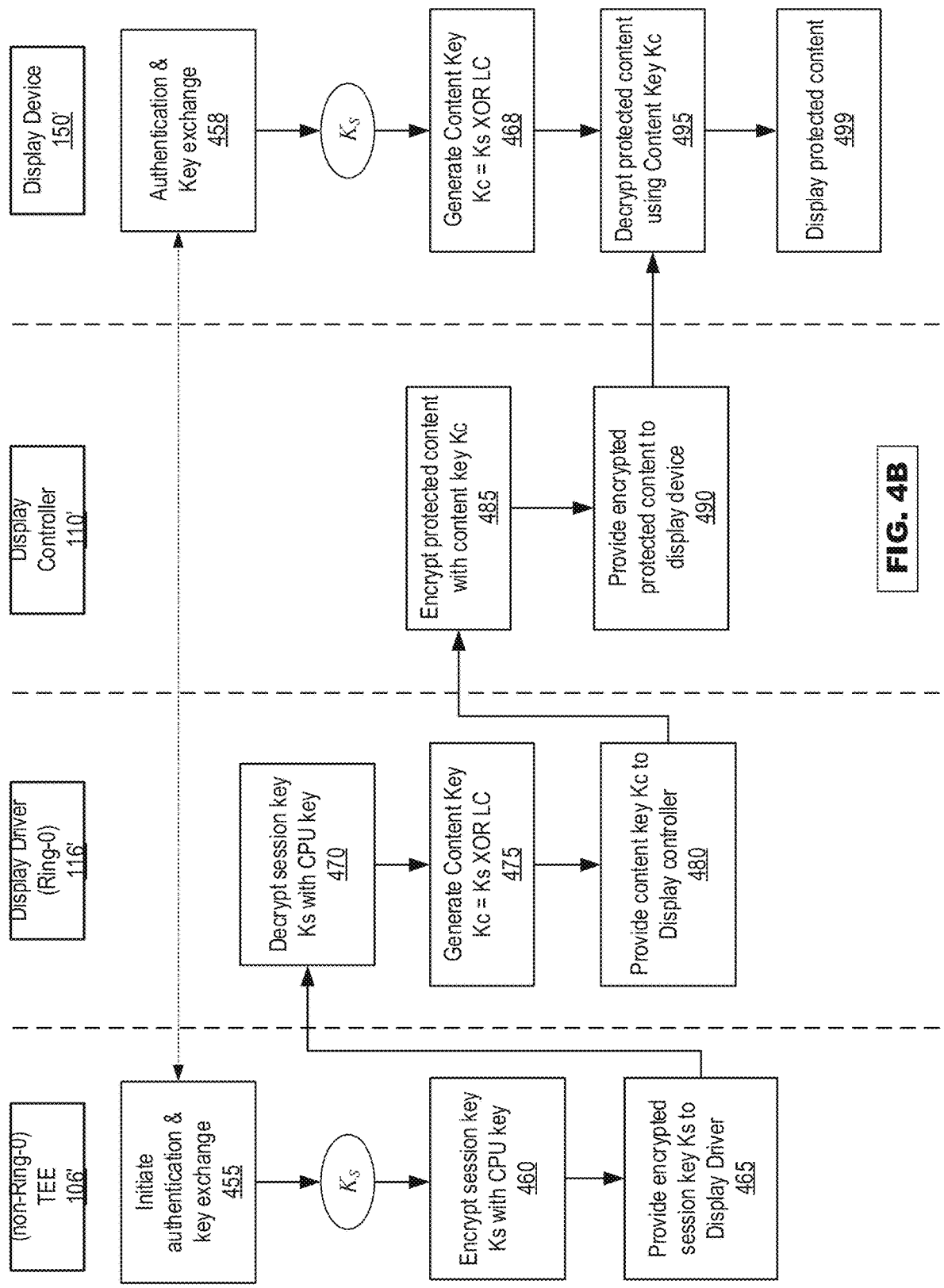
FIG. 4B illustrates additional exemplary operations for secure processing and display of protected content in accordance with at least one embodiment of the present disclosure.

FIG. 4B illustrates additional exemplary operations for secure processing and display of protected content in accordance with at least one embodiment of the present disclosure. In a manner similar to that used to describe the depicted embodiment of FIG. 4A, various operations are depicted in graphically separated areas according to the particular circuitry and/or components performing such operations.

In operation 455 a non-ring-0 TEE 106a' initiates authentication and key exchange with a display device 150', such as in response to a request to display protected content, and resulting in the provision of negotiated session key $K_S$ to both non-ring-0 TEE 106' and display device 150'. In operation 460, the non-ring-0 TEE 106' encrypts the session key using a device-specific cryptographic key ("CPU key"). In operation 465, non-ring-0 TEE 106' provides the encrypted session key to ring-0 display driver 116'. In at least some embodiments, one or both of operations 460 and 465 may be performed by the non-ring-0 TEE 106' via microcode instructions, such as via the HDCP_PREPARE microcode instruction described elsewhere herein.

In operation 470, display driver 116' decrypts the negotiated session key using the device-specific CPU key; in operation 475, the display driver 116' generates a content encryption key $K_C$ based on the decrypted session key and a provisioned licensing constant. In operation 480, the generated content encryption key is provided to display controller 110'. In at least some embodiments, some or all of operations 470, 475, and 480 may be accomplished via use of one or more microcode instructions, such as via the HDCP_INJECT microcode instruction described elsewhere herein. In operation 485, display controller 110' encrypts the protected content with the generated content encryption key provided by display driver 116'. In operation 490, the display controller 110' provides the encrypted protected content to display device 150'.

In a manner similar to that noted elsewhere with respect to other exemplary embodiments described herein, once negotiated session key $K_S$ was established via operations 455 and 458, in operation 468 the display device 150' generates its own copy of content encryption key $K_C$. In operation 495, the display device 150' uses the generated content encryption key to decrypt the protected content provided via operation 490 by the display controller 110'. In operation 499, display device 150' displays the protected content in compliance with the selected HDCP protocol.

While FIGS. 4A and 4B illustrate operations according to particular embodiments in accordance with techniques described herein, it is to be understood that not all of the operations depicted in FIGS. 4A and 4B are necessary for other embodiments. Indeed, it is fully contemplated herein that in other embodiments of the present disclosure, the operations depicted in FIGS. 4A and 4B, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical discs, compact disc read-only memories (CD-ROMs), compact disc rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to secure processing and display of protected content. The use of a trusted execution environment (TEE) to handle authentication and session key negotiation in accordance with a selected content protection protocol may reduce the scope of any trusted computing base (TCB) needed for such operations, and thereby present a smaller target for potential attackers. A session key negotiated via such a TEE may be securely provided to output circuitry such as a display controller, which may encrypt protected content that has been requested for viewing on a protocol-compliant display device communicatively coupled to a device comprising the TEE and/or the output circuitry. The output circuitry may be to provide the encrypted protected content to the protocol-compliant display device, such as for compliant display of the protected content.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for secure display of protected content.

According to example 1 there is provided a system for secure display of protected content. The system may comprise a trusted execution environment (TEE) to initiate key exchange with an authenticated display device, to determine a session key based on the initiated key exchange, and to provide the session key to a host processor. The system may further comprise a host processor provisioned with a licensing constant, the host processor to receive the session key from the TEE, to modify the session key based on the licensing constant, and to provide protected content and the modified session key. The system may further comprise a display controller to receive the modified session key and protected content from the TEE and to encrypt the protected content with the modified session key.

Example 2 may include the elements of example 1, wherein the display controller is further to provide the encrypted protected content to the authenticated display device.

Example 3 may include the elements of any of examples 1 to 2, wherein the TEE is further to authenticate the display device in accordance with a selected content protection protocol.

Example 4 may include the elements of example 3, wherein to authenticate the display device in accordance with a selected content protection protocol includes to authenticate the display device in accordance with an HDCP protocol, and further includes to authenticate the display device in accordance with the HDCP protocol by authenticating a certificate provided by the display device and associated with a third-party certification entity for the HDCP protocol.

Example 5 may include the elements of any of examples 1 to 4, wherein to modify the session key based on the licensing constant includes to generate a session-specific content encryption key using the licensing constant to perform one or more operations on the session key.

Example 6 may include the elements of any of examples 1 to 5, wherein the TEE comprises a non-ring-0 TEE that is unauthorized to communicate with the display controller, wherein the system further comprises a ring-0 device driver, and wherein to provide the session key to the host processor includes to encrypt (such as by the non-ring-0 TEE) the session key using a device-specific cryptographic key, and to provide (such as by the non-ring-0 TEE) the encrypted session key to the ring-0 device driver.

Example 7 may include the elements of example 6, wherein to modify the session key based on the licensing constant includes to modify the session key via the ring-0 device driver, and wherein to provide the protected content and the modified session key to the display controller includes to provide the protected content and the modified session key to the display controller via the ring-0 device driver.

According to example 8 there is provided a method for secure processing and display of protected content. The method may comprise initiating, via trusted execution environment (TEE) circuitry, key exchange with an authenticated display device. The method may further comprise determining, such as via the TEE circuitry, a session key based on the initiated key exchange. The method may further comprise providing, such as via the TEE circuitry, the session key to a host processor provisioned with a licensing constant. The method may still further comprise modifying, such as via the host processor, the session key based on the licensing constant. The method may still further comprise providing, such as via the host processor, a requested portion of protected content and the modified session key to a display controller. The method may further comprise encrypting, such as via display controller circuitry of the display controller, the requested portion of the protected content based on the modified session key.

Example 9 may include the elements of example 8, further comprising providing, such as via the display controller circuitry, the encrypted requested portion of the protected content to the authenticated display device.

Example 10 may include the elements of any of examples 8 to 9, further comprising authenticating, such as via the TEE circuitry, the display device in accordance with an HDCP protocol.

Example 11 may include the elements of example 10, wherein authenticating the display device in accordance with the HDCP protocol includes authenticating a certificate provided by the display device in association with a third-party certification entity for the HDCP protocol.

Example 12 may include the elements of any of examples of 8 to 11, wherein the TEE circuitry comprises a non-ring-0 TEE that is unauthorized to access the display controller, and wherein providing the session key to the host processor includes the non-ring-0 TEE encrypting the session key based on a distinct hardware-specific cryptographic key and providing the encrypted session key to a device driver.

Example 13 may include the elements of example 12, wherein the modifying of the session key based on the licensing constant is performed via the device driver.

Example 14 may include the elements of any of examples of 12 to 13, wherein the providing of the requested portion of protected content and the modified session key to the display controller is performed via the device driver.

According to example 15 there is provided at least one computer-readable storage medium having instructions stored thereon which, when executed by a processor result in the following operations for secure processing and display of protected content. Said operations may comprise initiating, such as via trusted execution environment (TEE) circuitry, key exchange with an authenticated display device. The operations may further comprise determining, such as via the TEE circuitry, a session key based on the initiated key exchange. The operations may further comprise modifying the session key based on the licensing constant, providing a requested portion of protected content and the modified session key to display controller circuitry, and encrypting (such as via the display controller circuitry) the requested portion of protected content based on the modified session key.

Example 16 may include the elements of example 15, wherein the resulting operations further comprise providing, such as via the display controller circuitry, the encrypted requested portion of the protected content to the authenticated display device.

Example 17 may include the elements of any of examples of 15 to 16, wherein the resulting operations further comprise authenticating, such as via the TEE circuitry, the display device in accordance with an HDCP protocol.

Example 18 may include the elements of example 17, wherein authenticating the display device in accordance with the HDCP protocol includes authenticating a certificate provided by the display device in association with a third-party certification entity for the HDCP protocol.

Example 19 may include the elements of any of examples of 15 to 18, wherein the TEE circuitry comprises a non-ring-0 TEE that is unauthorized to access the display controller, and wherein providing the session key to the host processor includes encrypting the session key via the non-ring-0 TEE based on a distinct hardware-specific cryptographic key and providing the encrypted session key to a device driver.

Example 20 may include the elements of example 19, wherein the providing of the requested portion of protected content to the display controller and/or the providing of the modified session key to the display controller is performed via the device driver.

According to example 21 there is provided an apparatus, comprising trusted execution environment (TEE) circuitry provisioned with a stored licensing constant, the TEE circuitry to initiate key exchange with an authenticated display device, to determine a session key based on the initiated key exchange, to modify the session key based on the stored licensing constant, and to provide the modified session key to output circuitry for encrypting requested content based on the modified session key.

Example 22 may include the elements of example 21, wherein the output circuitry comprises a display controller.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system for secure display of protected content, the system comprising:
    a ring-0 device driver;
    a non-ring-0 trusted execution environment (TEE) to initiate a key exchange with an authenticated display device, to determine a session key based on the initiated key exchange, to encrypt the session key using a device-specific cryptographic key, and to provide the encrypted session key to the ring-0 device driver;
    a host hardware processor provisioned with a circuitry-implemented licensing constant, the host hardware processor to receive the encrypted session key from the TEE via the ring-0 device driver, to modify the session key based on the circuitry-implemented licensing constant, and to provide protected content and the modified session key via the ring-0 device driver; and
    a display controller to receive the modified session key and the protected content from the ring-0 device driver and to encrypt the protected content with the modified session key, wherein the non-ring-0 TEE is unauthorized to communicate with the display controller.

2. The system of claim 1, wherein the display controller is further to provide the encrypted protected content to the authenticated display device.

3. The system of claim 1, wherein the non-ring-0 TEE is further to authenticate the display device in accordance with a selected content protection protocol.

4. The system of claim 3, wherein to authenticate the display device in accordance with the selected content protection protocol includes to authenticate the display device in accordance with an HDCP protocol, and further includes to authenticate the display device in accordance with the HDCP protocol by authenticating a certificate provided by the display device and associated with a third-party certification entity for the HDCP protocol.

5. The system of claim 1, wherein to modify the session key based on the circuitry-implemented licensing constant includes to generate a session-specific content encryption key using the circuitry-implemented licensing constant to perform one or more operations on the session key.

6. The system of claim 1, wherein, prior to the session key being modified via the ring-0 device driver, the ring-0 device driver is to decrypt the encrypted session key provided by the non-ring-0 TEE.

7. A method for secure processing and display of protected content, the method comprising:
    initiating, via non-ring-0 trusted execution environment (TEE) circuitry, a key exchange with an authenticated display device;
    determining, via the non-ring-0 TEE circuitry, a session key based on the initiated key exchange;
    providing, via the non-ring-0 TEE circuitry, the session key to a host processor provisioned with a circuitry-implemented licensing constant, wherein providing the session key to the host processor includes the non-ring-0 TEE encrypting the session key based on a distinct hardware-specific cryptographic key and providing the encrypted session key to a device driver;
    modifying, via the device driver, the session key based on the circuitry-implemented licensing constant;
    providing, via the host processor, a requested portion of protected content and the modified session key to a display controller, wherein the non-ring-0 TEE circuitry is unauthorized to access the display controller; and
    encrypting, via display controller circuitry of the display controller, the requested portion of the protected content based on the modified session key.

8. The method of claim 7, further comprising providing, via the display controller circuitry, the encrypted requested portion of the protected content to the authenticated display device.

9. The method of claim 7, further comprising authenticating, via the non-ring-0 TEE circuitry, the display device in accordance with an HDCP protocol.

10. The method of claim 9, wherein authenticating the display device in accordance with the HDCP protocol includes authenticating a certificate provided by the display device in association with a third-party certification entity for the HDCP protocol.

11. The method of claim 7, wherein the providing of the requested portion of the protected content and the modified session key to the display controller is performed via the device driver.

12. The method of claim 7, further comprising decrypting the encrypted session key prior to the modifying the session key.

13. At least one non-transitory computer-readable storage medium having instructions stored thereon which, when executed by a processor, result in operations for secure processing and display of protected content, the operations comprising:
    initiating, via non-ring-0 trusted execution environment (TEE) circuitry, a key exchange with an authenticated display device;
    determining, via the non-ring-0 TEE circuitry, a session key based on the initiated key exchange;
    encrypting, via the non-ring-0 TEE circuitry, the session key based on a distinct hardware-specific cryptographic key;
    providing, from the non-ring-0 TEE, the encrypted session key to a device driver;
    modifying the session key based on a circuitry-implemented licensing constant;
    providing, via the device driver, a requested portion of protected content and the modified session key to display controller circuitry, wherein the non-ring-0 TEE circuitry is unauthorized to access the display controller; and
    encrypting, via the display controller circuitry, the requested portion of the protected content based on the modified session key.

14. The non-transitory computer-readable storage medium of claim 13, wherein the operations further comprise providing, via the display controller circuitry, the encrypted requested portion of the protected content to the authenticated display device.

15. The non-transitory computer-readable storage medium of claim 13, wherein the operations further comprise authenticating, via the non-ring-0 TEE circuitry, the display device in accordance with an HDCP protocol.

16. The non-transitory computer-readable storage medium of claim 15, wherein authenticating the display device in accordance with the HDCP protocol includes authenticating a certificate provided by the display device in association with a third-party certification entity for the HDCP protocol.

17. The non-transitory computer-readable storage medium of claim 13, wherein the operations further comprise, prior to the modifying the session key, decrypting the encrypted session key provided from the non-ring-0 TEE.

\* \* \* \* \*